United States Patent [19]

Sasamura et al.

[11] 3,953,686

[45] Apr. 27, 1976

[54] MULTICHANNEL RECORD DISC RECORDING SYSTEM

[75] Inventors: Kohei Sasamura, Sagamihara; Yukinobu Ishigaki, Yamato, both of Japan

[73] Assignee: Victor Company of Japan, Ltd., Yokohama, Japan

[22] Filed: Apr. 22, 1974

[21] Appl. No.: 462,648

[30] Foreign Application Priority Data

Apr. 27, 1973 Japan .............................. 48-48809

[52] U.S. Cl. .................... 179/100.4 ST; 179/1 GQ; 179/100.1 TD

[51] Int. Cl.² ........................ G11B 3/00; G11B 3/74

[58] Field of Search ............ 179/1 G, 1 GQ, 15 BT, 179/100.1 TD, 100.4 C, 100.4 ST

[56] References Cited

UNITED STATES PATENTS

| | | | |
|---|---|---|---|
| 3,686,471 | 8/1972 | Takahashi | 179/100.1 TD |
| 3,772,479 | 11/1973 | Hilbert | 179/100.4 ST |
| 3,839,602 | 10/1974 | Takahashi | 179/1 GQ |

OTHER PUBLICATIONS

"4–Channel Matrix How Good Is It?" by Walters Radio–Electronics Mar. 1973 pp. 35–38.

*Primary Examiner*—Bernard Konick
*Assistant Examiner*—Stewart Levy

[57] ABSTRACT

A multichannel record disc recording system comprises automatic gain control circuits for each of the multichannels a control voltage, representing the phases and levels of the multichannel signals, control the gain of the automatic gain control circuits. An operational circuit at the output of the automatic gain control circuits produces an output sum signal and a difference signal. The difference signal, is angle modulated and multiplexed with the sum signal. The resulting multiplexed signal is recorded on a record disc. Each of the automatic gain control circuits carries out a gain control operation so that the maximum level of the output sum signal does not exceed a predetermined level, and the maximum level of the output signal of the automatic gain control circuit exceeds one half of the predetermined level.

11 Claims, 3 Drawing Figures

MULTICHANNEL RECORD DISC RECORDING SYSTEM

BACKGROUND OF THE INVENTION

This invention relates generally to a multichannel record disc recording system and more particularly to a system wherein automatic gain control is effectively carried out for each channel to be recorded. Then, the signal of each channel is matrixed and recorded on a multichannel record disc.

A previously proposed recording and/or reproducing system, for four channel record discs, is disclosed in U.S. Pat. No. 3,686,471, issued Aug. 22, 1972, and entitled "System for Recording and/or Reproducing Four Channel Signals on a Record Disc." This system is already a commercial success on a worldwide basis.

By this proposed system, sum and difference signals are formed respectively from two pairs of two channel signals, comprising the four channels. More specifically, the four signals of the first through fourth channels are respectively denoted by the notations CH1, CH2, CH3, and CH4. Sum signals (CH1 + CH2) and (CH3 + CH4) and difference signals (CH1 − CH2) and (CH3 − CH4) are formed from these four signals.

Thereafter, the difference signals are angle modulated, to form angle modulated wave difference signals F(CH1 − CH2) and F(CH3 − CH4) in a frequency band which is higher than the above mentioned direct wave sum signals. These signals are mixed with the direct wave sum signals (CH1 + CH2) and (CH3 + CH4). Two sets of multiplexed signals {(CH1 + CH2) + F(CH1 − CH2)} and {(CH3 + CH4) + F(CH3 − CH4)} are formed from these direct wave sum signals and angle modulated wave difference signals. These two sets are recorded on the left and right walls of a single groove, of the 45—45 system, on a record disc. The direct wave sum signals are in a frequency band from 0 to 15 KHz, while the angle modulated wave difference signals are in a frequency band from 20 KHz to 45 KHz.

In the above described recording system, an automatic gain control circuit is used. If the level of the signal of each channel is excessive, the signal level is controlled so that recording is normally carried out. This automatic gain control circuit uses a limiting amplifier capable of automatic gain control.

If two channel signals are mutually matrixed, (i.e., the first and second channel signals or the third and fourth channel signals) they are of the same phase and the same level. For example, the sum signal obtained by their matrixing is of a level which is twice the level of each channel signal. Furthermore, if the two channel signals are of mutually opposite phase and the same level, the difference signal obtained by their matrixing has a level which is twice the level of each channel signal. Here, the difference signal does not present a very great problem even when its level becomes excessive since it is angle modulated, as mentioned above. However, the sum signal is multiplexed, as a direct wave, with the angle-modulated wave and thus recorded. Therefore, when its level becomes excessive, the direct-wave sum signal imparts interference to the angle-modulated wave.

Accordingly, it has been the practice heretofore to preset the automatic gain control circuit in each of the channel signal paths so that the level of its output signal is one half of the optimum maximum level, for recording the maximum sum signal. When the channel signals are of the same phase and the same level, the level of the sum signal is twice the level of each channel signal. The level of this sum signal becomes suitable for recording, without imparting a deleterious effect upon the angle-modulated wave difference signal component.

For this reason, the levels of the channel signals are always held, as a maximum, to one half of the optimum maximum level during a recording of the sum signal. These levels are held irrespective of the mutual relationships of their phases and levels. The recording level, of the entire recording signal or the average energy level of the recording signals, is always lowered. This has been one problem associated with the above described conventional system.

One conceivable measure for overcoming this problem is to provide an automatic gain control circuit in only the sum signal path, following the matrix circuit, instead of providing an automatic gain control circuit in each channel signal path. This arrangement overcomes the above described problem of controlling the recording level of the entire recording signal or of lowering the average energy level of the recording signals. On the other hand, there is no automatic gain control with respect to the difference signal. Hence, there are the problems in which the position of the reproduced sound source varies and the degree of separation is impaired when the record is reproduced. Therefore, this measure is not practical.

SUMMARY OF THE INVENTION

Accordingly, a general object of the present invention is to provide a novel and useful multichannel record disc recording system in which the above described problems of the known systems have been solved.

A specific object of the invention is to provide a multichannel record disc recording system capable of recording without lowering the recording level of the entire recording signal or average energy level of the recording signals. Here, an object is to avoid impairing the degree of separation.

Still another object of the invention is to provide a recording system wherein the phases and levels of the signals of two channels to be matrixed are compared to control the automatic gain control operations of automatic gain control circuits for the channel signals. Automatic gain control is accomplished in a manner such that the recording signal is always within a level range not exceeding the optimum maximum level. Moreover, the recording level is not suppressed to an excessively low level, as it is recorded on a disc.

Other objects and further features of the invention will be apparent from the following detailed description when read in conjunction with the accompanying drawings.

DETAILED DESCRIPTION

Figure 1:
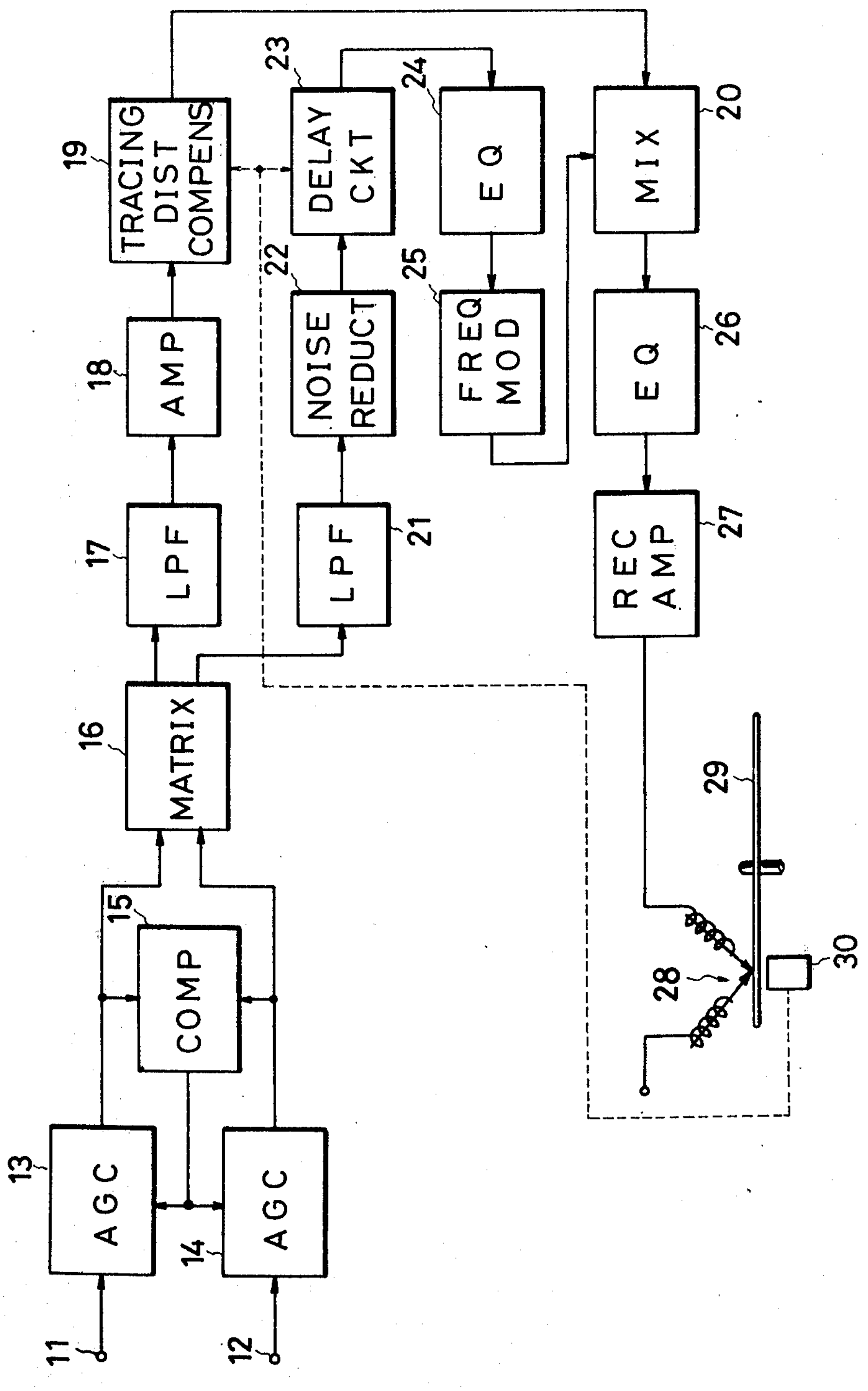
FIG. 1 is a block diagram showing the essential arrangement of one embodiment of a multichannel record disc recording system according to the invention.

Referring first to FIG. 1, the general features of the recording system of the invention will be described. First and second channel signals CH1 and CH2 entering through input terminals 11 and 12 are respectively supplied to automatic gain control circuits 13 and 14. There, they are subjected to automatic gain control, whereby their levels are controlled. The resulting output signals CH1 and CH2 of these automatic gain control circuits 13 and 14 are supplied to a matrix circuit 16 and to a comparison circuit 15. This comparison circuit 15 compares the phases and levels of the first and second channel signals CH1 and CH2 to produce a comparison output which is fed back to control the automatic gain control circuits 13 and 14.

The first and second channel signals CH1 and CH2 sent to the matrix circuit 16 are matrixed to form sum and difference signals. The output sum signal (CH1 + CH2) of the matrix circuit 16 is supplied by way of a low-pass filter 17, an amplifier 18, and a tracing distortion compensation circuit 19 to a mixer 20.

An output difference signal (CH1 − CH2) of the matrix circuit 16 is passed through a low-pass filter 21, a noise reduction circuit 22, and a delay circuit 23. This delay circuit 23 imparts to the difference signal a delay quantity, as a result of passing the direct wave sum signal through the tracing distortion compensation circuit 19. There is a time matching of the sum and difference signals. In actual practice, it is necessary to match the delay times in their entirety including the recording and reproducing systems. The delay time of the delay circuit 23 is so selected that the time difference between the direct wave signal and the angle modulated wave signal in the recording system will be 40 microseconds.

The difference signal delayed by the delay circuit 23, acquires a specific frequency characteristic in a FM-PM correction equalizer 24 and is supplied to a frequency modulator 25. A carrier wave of 30 KHz is frequency modulated (FM) by a difference signal of less than 800 Hz, phase modulated (PM) by a difference signal of from 800 Hz to 6 KHz, and frequency modulated (FM) by a difference signal of more than 6 KHz, whereby it becomes an angle modulated wave of a band from 20 KHz to 45 KHz. The angle modulated difference signal is supplied to the mixer 20 where it is mixed and multiplexed with the output direct wave sum signal of the tracing distortion compensation circuit 19.

The multiplexed signal output of the mixer 20 is passed through an RIAA (Recording Industries Association of America) characteristic equalizer 26, and a recording amplifier 27. Then, it is supplied to one of the coils for driving the cutting stylus of a cutting machine 28. The drive stylus cuts and records on one wall of one groove of a disc 29.

A system, which is the same as the system described by the block diagram in FIG. 1, is provided for the third and fourth channel signals. These signals are similarly processed to produce a multiplexed signal, supplied to the other cutting stylus driving coil of the cutting machine 28. The multiplexed signal is cut and recorded on the other wall of the sound groove of the disc 29.

Since the relative linear speed between the cutting stylus and the disc 29 varies with the position of the stylus on the disc in the radial direction, that position is detected by means of a stylus position detecting device 30. The detection output is used to control the tracing distortion compensation circuit 19. The delay circuit 23 varies the tracing distortion compensation waveform and the delay time.

If the automatic gain control circuits 13 and 14 are not controlled by the phase and level comparison circuit 15, and the input is less than $2V_1$, they produce output signals proportional to the input. When a voltage higher than $2V_1$ appears as an input, the automatic gain control operation limits the output voltage at $2V_o$, as shown by the curve I in FIG. 2.

If the first and second channel signals are of the same phase and the same level, for example, the comparison circuit 15 controls the automatic gain control circuits 13 and 14.

Figure 2:
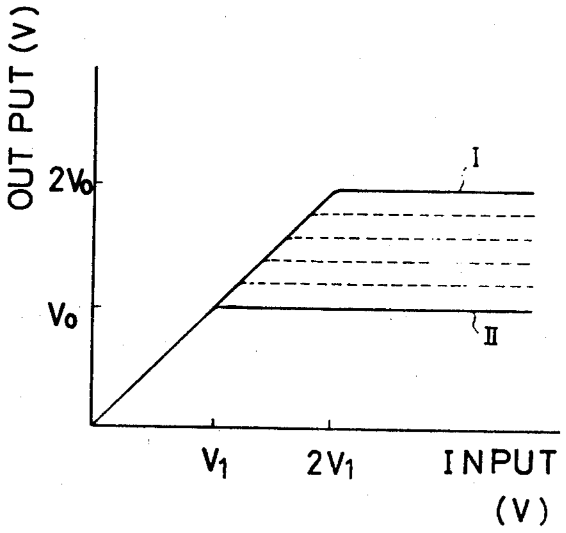
FIG. 2 is a graph indicating the input-output voltage characteristic of an automatic gain control circuit in the recording system of the invention.

The input-output voltage characteristic of the automatic gain control circuits 13 and 14 are, as indicated by curve II in FIG. 2. When the input is less than $V_1$, an output proportional to this input is produced. When the input is higher than $V_1$, the output is limited to $V_o$. Consequently, the input-output characteristics of the automatic gain control circuits 13 and 14 vary between the curves I and II, as indicated by the broken lines in FIG. 2. Variation is in accordance with the relationships between the phases and levels of the input first and second channel signals CH1 and CH2.

Accordingly, for example, the level of one of the channel signals is zero, the level of the output sum signal (CH1 + CH2) of the matrix circuit 16 is the maximum 2V even when the level of the other channel signal is higher than $2V_1$. Furthermore, if, for example, the two channel signals are of the same phase, the levels of the output signals of the automatic gain control circuits 13 and 14 are both limited to $V_0$ even when the levels of the two channel signals are higher than $V_1$. The level of the output sum signal (CH1 + CH2) of the matrix circuit 16 is thus limited to $2V_o$.

In other words, with the maximum level of the output sum signal (CH1 + CH2) of the matrix circuit 16 limited at $2V_o$, the level control of each of the channel signals CH1 and CH2 is so carried out within the range of $V_0$ to $2V_o$.

In the known arrangement the level control of all channel signals is fixed so that the level will be the maximum $V_0$. The maximum level of the output sum signal of the matrix circuit 16 will be limited to $2V_o$. In the system of the present invention, the level of each of the channel signals is controlled to become the maximum $2V_0$ under the condition that the maximum level of the output sum signal of the matrix circuit 16 is $2V_o$. For this reason, the level control of the channel signals is not carried out unnecessarily. Therefore, the level of the entire recording signal is higher than that in known systems, and the average energy level is high.

The level $2V_0$ is, of course, predetermined in accordance with the recording optimum maximum level. The cutting machine 28 can make an excellent recording, to prevent interference of the angle-modulated wave difference signal by the direct wave sum signal.

Figure 3:
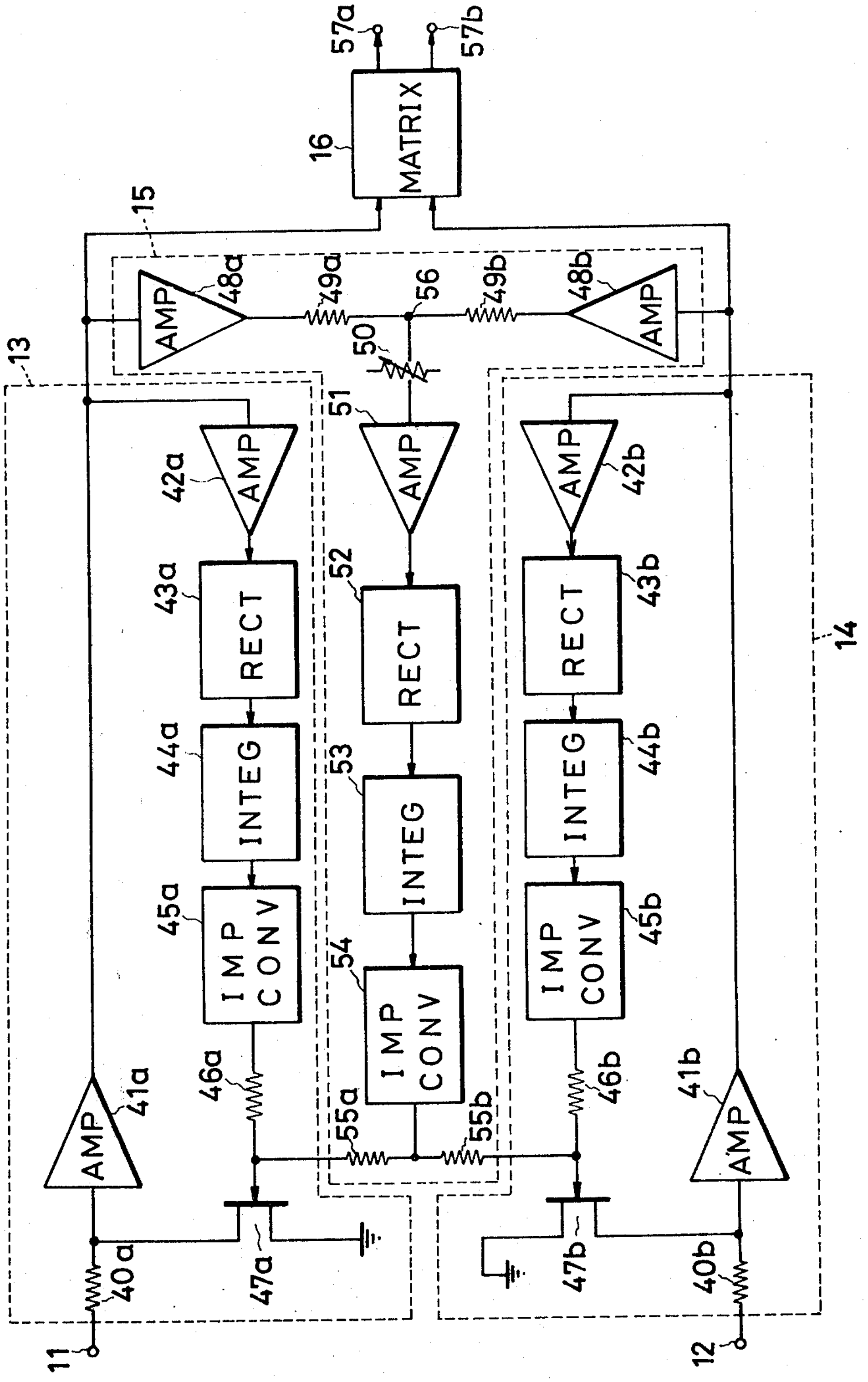
FIG. 3 is a circuit diagram, partly in block diagram form, showing a specific embodiment of automatic gain control circuit of the recording system.

One embodiment of a specific circuit arrangement of the automatic gain control circuit 13 and 14 and the phase and level comparison circuit 15 will now be described with reference to FIG. 3. The automatic gain control circuit 13 for the first channel and the automatic gain control circuit 14 for the second channel are identical. Similar parts are designated by the same reference numerals, with subscripts *a* and *b*, respectively to distinguish the two circuits. The following description is set forth principally with respect to the automatic gain control circuit 13.

The first channel signal impressed on the input terminal 11 is supplied by way of a resistor 40*a* to an amplifier 41*a*. A field-effect transistor (FET) 47*a* is connected as a variable resistance element between the input side of the amplifier 41*a* and ground (earth). The amplifier 41*a* operates as a limiting amplifier having a gain controlled by the variation of the resistance of the FET 47*a* . The output signal of this amplifier 41*a* is supplied respectively to an amplifier 42*a* in a feed back loop to the FET 47*a*, a buffer amplifier 48*a* in the phase and level comparison circuit 15, and the matrix circuit 16.

The signal passing through the amplifier 42*a* is thereafter rectified by a rectifier 43*a* and is then integrated in an integration circuit 44*a* . There, into a DC control voltage is formed in accordance with the signal level thereof. This voltage is passed through an impedance conversion circuit 45*a* and is applied by way of a resistor 46*a* to the gate of the FET 47*a*.

Similarly, a second channel signal is supplied from the automatic gain control circuit 14 to a buffer amplifier 48*b* of the phase and level comparison circuit 15. Consequently, the first and second channel signals fed to the buffer amplifiers 48*a* and 48*b* pass through mixing resistors 49*a*, 49*b* and are combined at a junction point 56. The level of the resulting combined signal is set at a suitable level by a variable resistor 50, is amplified by an amplifier 51, rectified by a rectifier 52, and integrated by an integration circuit 53, thereby becoming a DC control voltage having a value corresponding to the relationships between the phases and levels of the first and second channel signals. Since this DC control voltage is obtained from the combined voltage of the above mentioned first and second channel signals, it becomes higher as the phases of the first and second channel signals approach each other and also with increasing levels of the first and second channel signals.

The DC voltage from the integration circuit 53 is sent through an impedance conversion circuit 54 and applied by way of resistors 55*a* and 55*b*, respectively, to the gates of FETs 47*a* and 47*b*. A DC control voltage which has passed through amplifiers 41*b* and 42*b*, a rectifier 43*b*, an integration circuit 44*b*, an impedance conversion circuit 45*b*, and a resistor 45*b* is applied to the gate of the FET 47*b* in the automatic gain control circuit 14, somewhat as in the automatic gain control circuit 13.

Accordingly, the resistance values of the FETs 47*a* and 47*b* are respectively controlled by control voltages of the automatic gain control circuits 13 and 14, which have passed through the resistors 46*a* and 46*b*, and by control voltages from the phase and level comparison circuit 15, which have passed through the resistors 55*a* and 55*b*. The gain of the amplifier 41*a* is determined by the voltage division ratio of the resistance value of the resistor 40*a* and the resistance value of the FET 47*a*. Gain is varied by the resistance value of the FET 47*a* in accordance with the above mentioned control voltage. The same applies also to the amplifier 41*b*.

Accordingly, if there is no control voltage from the comparison circuit 15, the automatic gain control circuits 13 and 14 carry out gain control to establish an input-output characteristic as indicated by curve I in FIG. 2. If the control voltage from the comparison circuit 15 is high, the automatic gain control circuits 13 and 14 effect gain control, whereby the input-output characteristic is as indicated by curve II in FIG. 2.

The first and second channel output signals of the automatic gain control circuits 13 and 14 are controlled in this manner. They are matrixed in the matrix circuit 16 and become an output sum signal (CH1 + CH2) and an output difference signal (CH1 − CH2), which are respectively supplied through output terminals 57*a* and 57*b* to the low-pass filters 17 and 21. Then, even if the maximum value of the controlled output signal CH1 or CH2 of the automatic gain control circuit 13 or 14 exceeds $V_o$, the maximum value of the above mentioned sum signal (CH1 + CH2) at no time exceeds $2V_o$.

Specific embodiments of amplifiers suitable for the above mentioned amplifiers 42*a*, 42*b*, and 51 are paraphase amplifiers which produce outputs of the same phase and outputs of opposite phase. Each of the rectifiers 43*a*, 43*b*, and 52 can be constituted by two diodes. Furthermore, an ordinary integration circuit comprising a resistor and a capacitor can be used for each of the integration circuits 44*a*, 44*b*, and 53.

Further, this invention is not limited to these embodiments. Various variations and modifications may be made without departing from the scope and spirit of the invention.

What is claimed is:

1. A multichannel record disc recording system comprising: a plurality of automatic gain control means for respectively controlling the gains of signals of a plurality of channels to produce respective output signals; operational means responsive to the output signals of said automatic gain control means to produce, as output, a sum signal and a difference signal; means for producing control signals responsive to the phases and levels of the output signals of said automatic gain control means; means for applying said control signals to said automatic gain control means; and means for angle modulating the output difference signals of said operational means and multiplexing the output difference signal on the output sum signal of the same operational means thereby to record the multiplexed difference and sum signals on a record disc.

2. A multichannel record disc recording system as claimed in claim 1 in which said automatic gain control means are controlled in the automatic gain control operation responsive to said control signal to provide a maximum level of the output sum signal of said operational means, which level does not exceed a predetermined level, and the maximum level of the output difference signal of the automatic gain control means exceeds one half of said predetermined level.

3. A multichannel record disc recording system as claimed in claim 1 in which said means for producing and applying the control signal comprises means for combining the output signals of said automatic gain control means into a combined signal and obtaining from said combined signal a control signal voltage in accordance with the phase and level of said output signal.

4. A multichannel record disc recording system as claimed in claim 1 in which each of said automatic gain control means comprises an amplifier, means including a negative feedback path for negatively feeding back one portion of the output of said amplifier to the input side thereof, and impedance varying means connected in said negative feedback path on the input side of said amplifier, said varying means providing a variation of the impedance thereof responsive to an impressed voltage to control the gain of said amplifier, and said means for applying control signals operates to apply to said impedance varying means the voltage of said control signals together with the negative feedback voltage of said negative feedback path.

5. A multichannel record disc recording system as claimed in claim 3 in which said means for producing and applying the control signal comprises combining means for combining the output signals of said automatic gain control means and means for rectifying the resulting output combined signal of said combining means and obtaining a DC control signal voltage.

6. A multichannel record disc recording system comprising two identical systems each being adapted to record the signal of two channels, and each of said systems comprising:

two automatic gain control circuits for respectively controlling the gains of said signals of the two channels, each of said automatic gain control circuits comprising an amplifier, a negative feedback path for negatively feeding back one portion of the output of the amplifier as a negative feedback voltage to the input side thereof, and a variable impedance element connected to the input side of the amplifier and operating when the impedance value thereof is varied responsive to a voltage applied thereto to control the gain of the amplifier;

an operational circuit means for operating on the output signals of said two automatic gain control circuits and producing as output a sum signal and a difference signal thereof;

means for producing as output a DC control voltage in accordance with the phases and levels of the output signals of the two automatic gain control circuits and applying the same together with the negative feedback voltage of the negative feedback path to the variable impedance element; and means for angle modulating the output difference signal of the operational circuit, multiplexing the resulting angle-modulated signal of the output sum signal of the operational circuit, and recording the resulting multiplexed signal on a record disc, each of said automatic gain control circuits being controlled in gain responsive to said control voltage in a manner whereby the maximum level of the output sum signal of the operational circuit does not exceed a predetermined level, and the maximum level of the output signal of that automatic gain control circuit exceeds one half of said predetermined level.

7. A multichannel record disc recording system as claimed in claim 6 and buffer amplifiers and resistors, said means for producing and applying the control voltage comprising circuit means for combining the output signals of said two automatic gain control circuits after said output signals have been passed through said buffer amplifiers and resistors, circuit means for rectifying the combined signal thereby to produce a DC control voltage, and circuit means for applying said DC control voltage simultaneously to the variable impedance elements of all automatic gain control circuits.

8. A multichannel record disc recording system as claimed in claim 6 in which each of said automatic gain control circuits accomplishes an automatic gain control operation in a manner whereby the maximum level of the output signal thereof can fall within the range between said predetermined level and one half of said predetermined level.

9. A multichannel record disc recording system comprising two identical systems and means for recording an output signal of one of the two systems on one wall of a signal groove of a record disc and an output signal of the other system on the other wall of the single groove; each of the two systems comprising:

first variable attenuation means responsive to one of two channel signals for attenuating the one of the two channel signals variably corresponding to a first control signal;

second variable attenuation means responsive to the other of the two channel signals for attenuating the other of the two channel signals variably corresponding to a second control signal;

first limiting amplifier means for amplifying the output signal of said first variable attenuation means;

second limiting amplifier means for amplifying the output signal of said second variable attenuation means;

first rectifying means for rectifying the output signal of said first limiting amplifier means to produce a first DC control voltage in accordance with the level of the output signal of said first limiting amplifier means;

second rectifying means for rectifying the output signal of said second limiting amplifier means to produce a second DC control voltage in accordance with the level of the output signal of said second limiting amplifier means;

comparing means for comparing the phases and the levels of the output signals of the first and second limiting amplifier means to produce a comparison output signal;

third rectifying means for rectifying the comparison output signal to produce a third DC control voltage having a value corresponding to the relationships between the phases and levels of the output signals of the first and second limiting amplifier means;

first mixing means for mixing the first DC control voltage and the third DC control voltage to produce the first control signal which is supplied to said first variable attenuation means, so that the maximum output signal of said first limiting amplifier means has a predetermined level when the third DC control voltage is absent and the maximum output signal has a level which decreases toward one half of the predetermined level from the predetermined level as the third DC control voltage increases;

second mixing means for mixing the second DC control voltage and the third DC control voltage to produce the second control signal which is supplied to said second variable attenuation means, so that the maximum output signal of said second limiting amplifier means has the predetermined level when the third DC control voltage is absent, and the maximum output signal of said second limiting amplifier means has a level which decreases toward one half of the predetermined level from the predetermined level as the third DC control voltage increases;

matrix circuit means for composing a sum signal and a difference signal responsive to the output signals of the first and second limiting amplifier means;

modulator means for angle-modulating a carrier wave with the difference signal; and multiplexing means for multiplexing the sum signal with the output signal of said modulator means to produce the output signal of the one of the two systems or the output signal of the other system.

10. A multichannel record disc recording system as claimed in claim 9 wherein each of the first and second variable attenuation means comprises a series combination of a resistor and a variable impedance element, the resistance value of which is varied corresponding to the level of the first control signal or the second control signal, an input signal being applied across said series combination and an output signal being taken out from the junction of the resistor and the variable impedance element.

11. A multichannel record disc recording system as claimed in claim 9 wherein each of the first, second and third rectifying means comprises a rectifier circuit for rectifying a signal applied thereto, an integration circuit for integrating the output signal of said rectifier circuit to produce a DC voltage in accordance with the signal applied to said rectifier circuit, and an impedance conversion circuit responsive to the DC voltage for producing a DC control voltage.

* * * * *